United States Patent [19]

Taira et al.

[11] Patent Number: 5,315,443
[45] Date of Patent: May 24, 1994

[54] ORGANIC OPTICAL MATERIAL

[75] Inventors: Tetsusaburo Taira; Makoto Ikari, both of Tokorozawa, Japan

[73] Assignee: Tokyo Seihinkaihatsu Kenkyusho, Japan

[21] Appl. No.: 76,882

[22] Filed: Jun. 15, 1993

[30] Foreign Application Priority Data

Jun. 22, 1992 [JP] Japan .................................. 4-202849

[51] Int. Cl.$^5$ .................................................. G02B 5/22
[52] U.S. Cl. ..................................... 359/885; 428/421; 524/714; 424/78.09; 359/589
[58] Field of Search ............... 359/885, 887, 888, 350, 359/589; 428/421, 195, 323, 402, 423.3; 503/227; 524/714; 424/78.09; 585/4, 5, 12, 14

[56] References Cited

U.S. PATENT DOCUMENTS

| | | | |
|---|---|---|---|
| 3,811,848 | 5/1974 | Johnson ................................. | 585/4 |
| 4,082,710 | 4/1978 | Vrancken et al. ................... | 524/714 |
| 4,643,537 | 2/1987 | Vance .................................... | 359/885 |
| 4,730,902 | 3/1988 | Suzuki et al. ........................ | 359/885 |
| 4,783,142 | 11/1988 | Mutzhas .............................. | 359/885 |
| 4,910,234 | 3/1990 | Yamamori et al. ............... | 424/78.09 |
| 5,116,113 | 5/1992 | Chu ....................................... | 359/885 |
| 5,141,915 | 8/1992 | Roenigk et al. ..................... | 503/227 |
| 5,246,782 | 9/1993 | Kennedy et al. .................. | 428/423.3 |

*Primary Examiner*—Loha Ben
*Attorney, Agent, or Firm*—Finnegan, Henderson, Farabow, Garrett & Dunner

[57] ABSTRACT

Water-resisting organic optical material having excellent transmittancy in visible range and less than 40% transmittancy in infra red range can be easily prepared by adding a metal compound for supplying a desired amount of $Cu^{++}$ ion, together with a compound for supplying carboxyl radical, phosphoric radical and/or sulfonic radical to a matrix resin.

4 Claims, No Drawings

ORGANIC OPTICAL MATERIAL

BACKGROUND OF THE INVENTION

1. Field of the Invention

This invention relates to an optical organic material, particularly an optical organic material having distinct absorption in Infra Red (IR) range and no absorption in visible range.

2. Description of the Prior Art

Materials having distinct absorption in IR range and no absorption in visible range are very important in the field of optical materials, particularly optical sensors consisting of CdS or Si very sensitive to red. Many types of materials were tried to overcome the problem in optical sensors. However, materials consisting of glass are very poor in water resistivity and durability. Materials consisting of synthetic resins have disadvantage in color deterioration. Thus, satisfactory filter materials are not known in the prior art.

Recently, it is proposed to disperse metal ions homogeneously in resin materials. However, it is very difficult to obtain a transparent material of excellent transmittancy through homogeneous and stable dispersion of metal ion in resin material without disturbing the ionic characteristics.

Accordingly, it is an object of the present invention to provide an optical organic material having excellent transmittancy without disturbing the ionic characteristics incorporated.

It is another object of the present invention to provide a process for dispersing metal ions in matrix resin easily and effectively.

SUMMARY OF THE INVENTION

According to the present invention, a compound containing at least one radical selected from the group consisting of carboxyl radical, phosphoric radical and sulfonic radical is incorporated into high molecular organic matrix resin, together with metal compounds mainly including $Cu^{++}$ ion, obtaining stable ionic dispersion in resin matrix without disturbing the ionic absorption characteristics.

Thus, the present invention provides novel optical organic material containing both a compound for supplying at least one radical selected from the group consisting of carboxyl radical, phosphoric radical and sulfonic radical, and a metal compound for supplying metal ions containing 80% by weight or more of $Cu^{++}$ ion therein.

The metal ions are to include 80% or more by weight of $Cu^{++}$ ion therein. Less than 80% of $Cu^{++}$ ion content (more than 20% of other metal ion) disturb to obtain the desired optical absorption characteristics.

Also, total metal ions including mainly $Cu^{++}$ ion are to be in an amount of 0.05–40% by weight of the optical material to be obtained. Less than 0.05% of the metal ion fail to obtain the desired optical absorption characteristics and more than 40 parts of the metal ion disturb homogeneous ion dispersion and the transmittancy of the optical product.

$Cu^{++}$ ion to be dispersed uniformly in matrix resin may be supplied through any compound containing $Cu^{++}$ ion. The compound includes Cu acetate, Cu oxalate, Cu formate, Cu oleate, Cu stearate, Cu fumalate, Cu laurate, Cu benzoate, Cu acetylacetonate, Cu citrate, Cu cyclohexanic butylate, Cu ethylacetate, Cu benzoylacetate, the hydrates thereof, Cu chloride, Cu sulfate, Cu phosphate, Cu carbonate, Cu hydroxide, Cu ammonium chloride, etc.

Also, any other metal ions such as Fe, Co, Ni, Sb, Ti, K, Mn, Cd. Tl, Ce, etc. may be added depending on any desired optical absorption characteristics of the products to be obtained. For this purpose, $Fe^{++}$ ion can be effectively and conveniently used because of particular absorption in IR range.

The compounds for supplying at least one radical selected from the group consisting of carboxylic radical, phosphoric radical and sulfonic radical include derivatives of orthophosphoric acid, sulfonic acid, carboxylic acid, formic acid, acetic acid, butyric acid, citric acid, benzoic acid, oleic acid, lauric acid, fumaric acid, stearic acid, phosphenic acid, metaphosphoric acid, diethylphosphate, phosphomolibdic acid, phenylphosphic acid, phenylphosphate, benzenesulfonic acid, and the like.

The optical material according to the present invention can be obtained mainly by the two processes. One way is to mix both the ion supplying compound including $Cu^{++}$ ion and a compound having at least one radical selected from the group consisting of carboxylic radical, phosphoric radical and sulfonic radical, with a transparent organic matrix resin such as acrylic resin, polycarbonate resin, polyvinylchloride resin, nylon resin polyethylene telephthalate resin, polystyrene resin, polyolefinic resin and the derivatives thereof. Homogeneous mixing can be effected at a temperature more than the m.p. of the resin employed through any desired means like roller, extruder, press, calendar, followed by forming into any desired shape. The other way includes polymerization process wherein a monomer compound having both radicals for polymerization and for ionic stabilization are reacted with monomers of the organic matrix resin such as methylmethacrylate, etc., the radical for polymerization including acryl, methacryl, vinyl and allyl and the radical for ionic stabilization including carboxylic, phosphonic and sulfonic radical. Also, an organic compound having both hydroxyl or isocyanate radical and having at least one radical selected from the group consisting of carboxylic radical, phosphoric radical and sulfonic radical may be reacted with a transparent matrix resin having radicals reactive with the above identified radicals. Transparent polymer thus obtained is then mixed with the metal compound containing $Cu^{++}$ ion. The transparent polymer can be also obtained by dissolving the metal compound in a monomer mixture containing monomer of the organic matrix resin like methylmethacrylate and an organic monomer compound including both radical for polymerization and for ionic stabilization before copolymerization. Then, the monomer mixture containing the metal ions is copolymerized into any desired shape. The organic matrix resin monomer for copolymerization may be any desired compound including methylmethacrylate, butyl acrylate, ethylmethacrylate, isopropylmethacrylate, styrene, α-methylstyrene, etc.

In some cases of the monomer mixture having a plural of acrylic (methacrylic) radicals, vinyl radicals and/or allyl radicals, the copolymer may be cross-linking and melt-moulding can not be effected. However, the cross-linking structure of the copolymer has an another advantage of less water absorption and can be formed by cutting or polishing.

Although content of carboxyl, phospheric and/or sulfonic radical thus introduced into the copolymer may be varied based on desired optical absorption characteristics of product, 0.05–50 parts by weight of the radicals are preferable for 100 parts by weight of the optical product to be obtained, less than 0.05 part content disturbing $Cu^{++}$ ion stabilization and $Cu^{++}$ ion characteristics, more than 50 parts increasing water absorption resulting in unstable state of $Cu^{++}$ ion.

DESCRIPTION OF THE PREFERRED EMBODIMENT

The following details of the present invention are given primarily for clearness of understanding and no unnecessary limitations should be understood therefrom for modifications will become obvious to one skilled in the art upon reading this disclosure and can be made without departing from the spirit of the invention and scope of the appended claims.

EXAMPLE 1

94.7 parts by weight of methylmethacrylate, 3 parts by weight of -methylstyrene, 2 parts by weight of methacrylic acid, and 0.3 part by weight of Cu acetate anhydride were mixed to obtain a homogeneous monomer solution. Then 1.0 part by weight of benzoyl peroxide as a radical polymerization reaction initiator.

The reaction temp., and the reaction period of time were 15 hrs. at 50° C., 3 hrs. at 80° C. and 3 hrs. at 100° C. respectively.

A blue transparent copolymer thus obtained contained 0.1% of Cu and 1.04% of -COOH based on methacrylic acid.

The copolymer obtained was pressed to a plate of 1.2 mm thickness and polished the surface thereby obtaining a transparent filter of 1.0 mm thickness.

Thus obtained filter revealed well sufficient transmittancy and absorption characteristics compared with conventional filters.

EXAMPLE 2

85 parts by weight of methylmethacrylate, 4.5 parts by weight of α-methylstyrene, and 10 parts by weight of methacrylic acid were mixed to obtain a homogeneous monomer solution. Then 1.0 part by weight of benzoyl peroxide was added thereto as a radical polymerization reaction initiator.

The reaction temp., and the reaction period of time were 15 hrs. at 50° C., 3 hrs. at 80° C. and 3 hrs. at 100° C. respectively.

95.5% by weight of thus obtained copolymer was mixed with 0.5% by weight of Cu lactate cyclohexane by means of roller blending at 120° C. and pressed to a plate of 1.2 mm thickness.

The plate surface was polished to obtain a transparent filter of 1.0 mm thickness.

Thus obtained filter revealed well sufficient transmittancy and absorption characteristics compound with conventional filters and increase in the weight of the filter determined after 2 hrs. immersion in ion exchanged water showed only 0.12% small increases.

EXAMPLE 3

67 parts by weight of acrylic resin, 3 parts by weight of Cu stearate (8% of Cu content), 30 parts by weight of the same resin as Example 2 except for containing no cyclohexane Cu lactate were mixed by means of roller at 120° C. to obtain a homogeneous mixture.

Thus obtained resin has 0.22% of Cu and 1.57% of -COOH based methacrylic acid.

The mixture was pressed to a plate of 1.2 mm thickness and polished the surface obtaining a transparent filter of 1.0 mm thickness.

Thus obtained filter revealed well sufficient transmittancy and absorption characteristics compound with conventional filters and the water absorbancy of the filter determined was only approximately 0.2% small increases.

EXAMPLE 4

90 parts by weight of isobutylmethacrylate, 2 parts by weight of -methylstyrene, 3 parts by weight of Cu acetate monohydrate, 4.5 parts by weight of mono (2-methacryloyloxylethyl) acid phosphate, and 0.5 part by weight of Fe phosphate (octa hydrate) were mixed to obtain a homogeneous monomer solution. Then 1.0 part by weight of benzoyl peroxide was added thereto as a radical polymerization reaction initiator.

The reaction temp., and the reaction period of time were 15 hrs. at 50° C., 3 hrs. at 80° C. and 3 hrs. at 100° C. respectively.

A copolymer containing 0.95% of Cu, 0.056% of Fe and 2.07% of $O=P(OH)_3$ was obtained.

The copolymer obtained was pressed to a plate of 1.2 mm thickness and polished the surface thereby obtaining a transparent filter of 1.0 mm thickness.

Thus obtained filter revealed well sufficient transmittancy and absorption characteristics compared with conventional filters and the water absorbancy of the filter determined was approximately 0.23% small increases.

EXAMPLE 5

81 parts by weight of methylmethacrylate, 3 parts by weight of α-methylstyrane, 5 parts by weight of divinylbenzene, 5 parts by weight of Cu-acetate anhydride, 3 parts by weight of methacrylic acid and 3 parts by weight of orthophosphoric acid (98%) were mixed to obtain a homogeneous monomer solution. Then 1.0 part by weight of benzoyl peroxide was added thereto as a radical polymerization reaction initiator.

The reaction temp., and the reaction period of time were 15 hrs. at 50° C., 3 hrs. at 80° C. and 3 hrs. at 100° C. respectively.

A transparent copolymer containing 1.74% of Cu, 1.56% of -COOH and 2.07% of $O=P-(OH)_3$ was obtained.

The copolymer obtained was cut to a plate and polished the surface thereby obtaining a transparent filter of 1.0 mm thickness.

Determination of transmitttancy and absorption characteristics of the filter was well satisfactory compared with conventional commercial filters and showed 0.11% of small water absorbancy.

EXAMPLE 6

86 parts by weight of methylmethacrylate, 5 parts by weight of α-methylstyrene, 5 parts by weight of Cu-benzoate, 3.5 parts by weight of methacrylic acid and 0.5 part by weight of vinylsulfonic acid were mixed to obtain a homogeneous monomer solution. Then 1.0 part by weight of benzoyl peroxide was added thereto as a radical polymerization reaction initiator.

The reaction temp., and the reaction period of time were 15 hrs. at 50° C., 3 hrs. at 80° C. and 3 hrs. at 100° C. respectively.

A transparent copolymer containing 1.03% of Cu. 1.82% of -COOH and 0.37% of $-SO_3H$ was obtained.

The copolymer obtained was pressed to a plate of 1.2 mm thickness and polished the surface thereby obtaining a transparent filter of 1.0 mm thickness.

Determination of transmittancy and absorption characteristics of the filter was well satisfactory compared with conventional commercial filters and showed 0.22% of small water absorbancy.

What we claimed is:

1. Organic optical material having excellent transmittancy in visible range, less than 40% in infra red range from 700 nm to 800 nm and improved water resistivity which comprises 0.05–40% by weight (calculated as the radical content) of a compound for supplying at least one radical selected from the group consisting of carboxyl radical, phosphoric radical and sulfonic radical, 0.05–40% by weight (calculated as ion content) of metal compound for supplying metal ions containing 80% or more of $Cu^{++}$ ion therein and the balance of high molecular organic matrix resin.

2. Organic optical material according to claim 1, wherein optical material is optical filter.

3. Organic optical material according to claim 1, wherein carboxylic radical and phosphoric radical are chemically bonded to the organic matrix resin.

4. Process for the preparation of an organic optical material which comprises adding a metal compound for supplying a desired amount of $Cu^{++}$ ion, together with a compound for supplying carboxyl radical, phosphoric radical and sulfonic radical, to organic matrix resin.

* * * * *